(12) United States Patent
Yang et al.

(10) Patent No.: US 7,986,370 B2
(45) Date of Patent: Jul. 26, 2011

(54) APPARATUS AND METHOD FOR DETECTING VERTICAL BLANKING INTERVAL

(75) Inventors: Yi Le Yang, Hsinchu (TW); Ming Feng Chou, Jhubei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1107 days.

(21) Appl. No.: 11/476,219

(22) Filed: Jun. 28, 2006

(65) Prior Publication Data

US 2007/0008426 A1 Jan. 11, 2007

(30) Foreign Application Priority Data

Jun. 28, 2005 (TW) .............................. 94121572 A (51) Int. Cl.
*H04N 7/00* (2011.01)
*H04N 11/00* (2006.01)
*H04N 5/00* (2011.01)

(52) U.S. Cl. ........ 348/465; 348/461; 348/466; 348/478; 348/607

(58) Field of Classification Search .................. 348/461, 348/465, 466, 478, 607
See application file for complete search history.

(56) References Cited

U.S. PATENT DOCUMENTS

| | | | | |
|---|---|---|---|---|
| 4,580,165 A * | 4/1986 | Patton et al. | .................. | 348/510 |
| 4,628,362 A * | 12/1986 | Waehner | ........................ | 348/572 |
| 5,249,050 A * | 9/1993 | Zato | .............................. | 348/478 |
| 5,301,023 A * | 4/1994 | Zato | .............................. | 348/476 |
| 5,596,372 A * | 1/1997 | Berman et al. | ................. | 348/537 |
| 5,629,738 A * | 5/1997 | Kim | ................................ | 348/465 |
| 5,963,273 A * | 10/1999 | Boie et al. | ..................... | 348/725 |
| 6,072,532 A * | 6/2000 | Chieh et al. | .................... | 348/478 |
| 6,239,843 B1 * | 5/2001 | Gaudreau | ....................... | 348/465 |
| 6,278,733 B1 * | 8/2001 | Bennett et al. | ................. | 375/240 |
| 6,285,403 B1 * | 9/2001 | Lee | ................................ | 348/465 |
| 6,377,308 B1 | 4/2002 | Cahill, III | ..................... | 348/361 |
| 6,381,287 B1 * | 4/2002 | Shin | ............................... | 375/316 |
| 6,445,420 B1 * | 9/2002 | Kim | ................................ | 348/465 |
| 6,449,016 B1 * | 9/2002 | Glassner et al. | .............. | 348/465 |
| 6,839,091 B1 * | 1/2005 | Hebbalalu et al. | ............. | 348/465 |
| 6,909,467 B2 * | 6/2005 | Kuzumoto et al. | ............ | 348/468 |
| 7,098,960 B2 * | 8/2006 | Suzuki et al. | .................. | 348/465 |
| 7,327,399 B2 * | 2/2008 | O'Connell | ...................... | 348/465 |
| 7,375,765 B2 * | 5/2008 | Kudou | ............................ | 348/465 |
| 7,463,308 B2 * | 12/2008 | Yamasaki et al. | ............. | 348/465 |
| 7,599,003 B2 * | 10/2009 | Suzuki et al. | .................. | 348/465 |
| 7,599,004 B2 * | 10/2009 | Shin et al. | ...................... | 348/478 |
| 2002/0008776 A1 * | 1/2002 | Kuzumoto et al. | ........... | 348/468 |
| 2003/0179316 A1 * | 9/2003 | Morooka | ........................ | 348/468 |
| 2004/0095510 A1 * | 5/2004 | Suzuki et al. | .................. | 348/465 |
| 2005/0195326 A1 * | 9/2005 | Kudou | ............................ | 348/465 |
| 2005/0212962 A1 * | 9/2005 | Matsuo et al. | ................. | 348/465 |
| 2006/0176395 A1 * | 8/2006 | Shin et al. | ...................... | 348/468 |
| 2006/0178395 A1 * | 8/2006 | Belmonte et al. | ............. | 514/304 |
| 2006/0268170 A1 * | 11/2006 | Suzuki et al. | .................. | 348/465 |
| 2006/0284980 A1 * | 12/2006 | Tierney et al. | ................ | 348/184 |

(Continued)

*Primary Examiner* — Brian Yenke
(74) *Attorney, Agent, or Firm* — Thomas, Kayden, Horstemeyer & Risley, LLP (57) ABSTRACT

An apparatus and method for detecting vertical blanking intervals (VBI) is disclosed. The apparatus can identify and filter non-VBI signals, and calculate a level value for digitization corresponding to the type of television signals. The apparatus includes a detecting unit and a coupled computing unit. The detecting unit is for generating a detecting signal according to a television signal. The computing unit is for calculating a slope of the detecting signal, and for determining whether the television signal contains a clock run-in signal according to the slope.

20 Claims, 8 Drawing Sheets

U.S. PATENT DOCUMENTS

2006/0288399 A1* 12/2006 Tierney et al. ................ 725/136
2007/0030386 A1* 2/2007 Cha et al. ...................... 348/468
2008/0074539 A1* 3/2008 Lee ............................... 348/465

* cited by examiner

| TV Specs | VBI Type | Line No. |
|---|---|---|
| NTSC | CC | 21, 22, 23 |
| | CGMS | 20, 283 |
| PAL | WSS | 23 |
| | VPS | 16, 239 |
| | TTX 625B | 6~23, 318~335 |

APPARATUS AND METHOD FOR DETECTING VERTICAL BLANKING INTERVAL

BACKGROUND OF INVENTION

1. Field of the Invention

The present invention relates to the vertical blanking interval (VBI) of TV signals, and more particularly, to an apparatus and method for detecting the vertical blanking interval.

2. Description of the Prior Art

Figure 1:
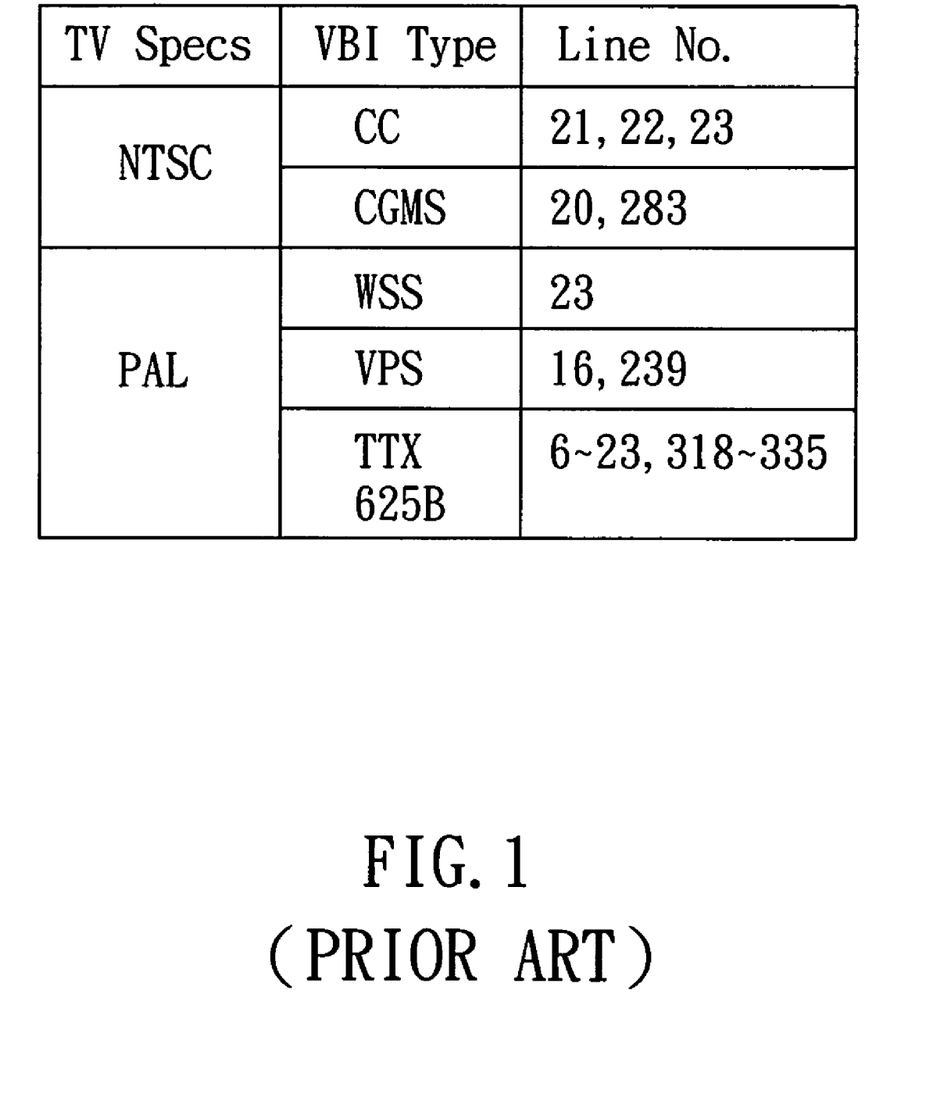
FIG. 1 shows the scan line positions for different VBI types.

The vertical blanking interval (VBI) is a blank interval reserved in a TV signal for the attachment of all kinds of user information. FIG. 1 shows the positions of scan lines for the VBI in different TV specifications. In the National Television System Committee (NTSC) system, each video frame has 525 scan lines; in the Phase Alternating Line (PAL) system, each video frame has 625 scan lines. FIG. 1 illustrates the scan line numbers for Closed Caption (CC), Copy Generation Management System (CGMS), Wildscreen Signaling (WSS), Video Programming System (VPS), and Teletext (TTX) 625B.

Figure 2:
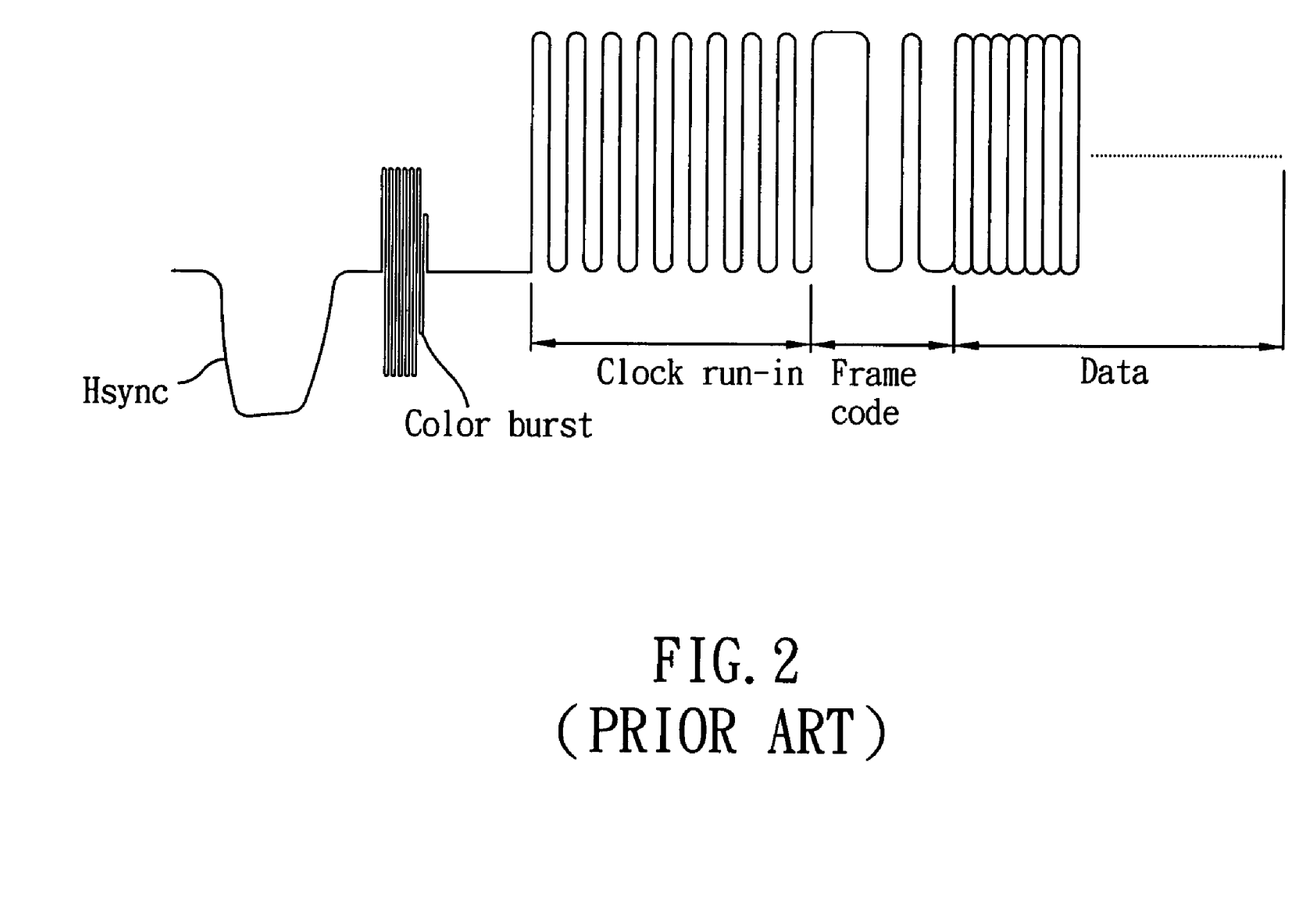
FIG. 2 is a schematic diagram of a typical VBI signal.

FIG. 2 is a schematic diagram of a typical VBI signal. As shown, the VBI signal contained in a scan line comprises the following portions: Hsync signal, color burst signal, clock run-in signal, frame code and data. Different VBI types correspond to different clock run-in signals and frame codes. A conventional VBI decoder is configured according to scan lines positions for a VBI signal within the TV signal. For example, VBI decoding is set to start when the scan line at a certain position is received. The VBI decoding first digitizes the received signals in reference to a preset constant level, for example, the DC voltage level, where the received signal is taken as 1 if its level is above the preset level, and 0 if its level is below the preset level. Next, the digitized signals are subject to slicing and parsing to complete the decoding.

However, the prior art is unable to identify whether the received signal is a VBI signal and hence unable to filter non-VBI noises. In addition, different reference levels needs to be set for different TV specifications, and also the level value should vary under different operating conditions. Hence using a constant reference level for signal digitizing lacks flexibility and accuracy.

SUMMARY OF INVENTION

It is therefore an object of the present invention to provide a VBI detection apparatus and method which can identify and automatically filter non-VBI noises.

Another object of the present invention is to provide a VBI detection apparatus and method, which can compute a corresponding level value for digitizing different types of TV signals.

A further object of the present invention is to provide a VBI decoder which includes the above VBI detection apparatus to enhance its performance.

According to an embodiment of the present invention, an apparatus for detecting a vertical blanking interval is provided. The apparatus comprises: a first detecting unit which generates a detecting signal according to a TV signal; and a computing unit coupled to the first detecting unit to compute a slope of the detecting signal and determine whether the TV signal contains a clock run-in signal according to the computed slope.

According to another embodiment of the present invention, a method for detecting a vertical blanking interval is provided. The method comprises the steps of: generating a detecting signal according to a TV signal; computing a slope of the detecting signal; and determining whether the TV signal contains a clock run-in signal according to the slope.

BRIEF DESCRIPTION OF THE DRAWINGS

The details of the present invention will be more readily understood from a detailed description of the preferred embodiments taken in conjunction with the following figures.

DETAILED DESCRIPTION

Figure 3:
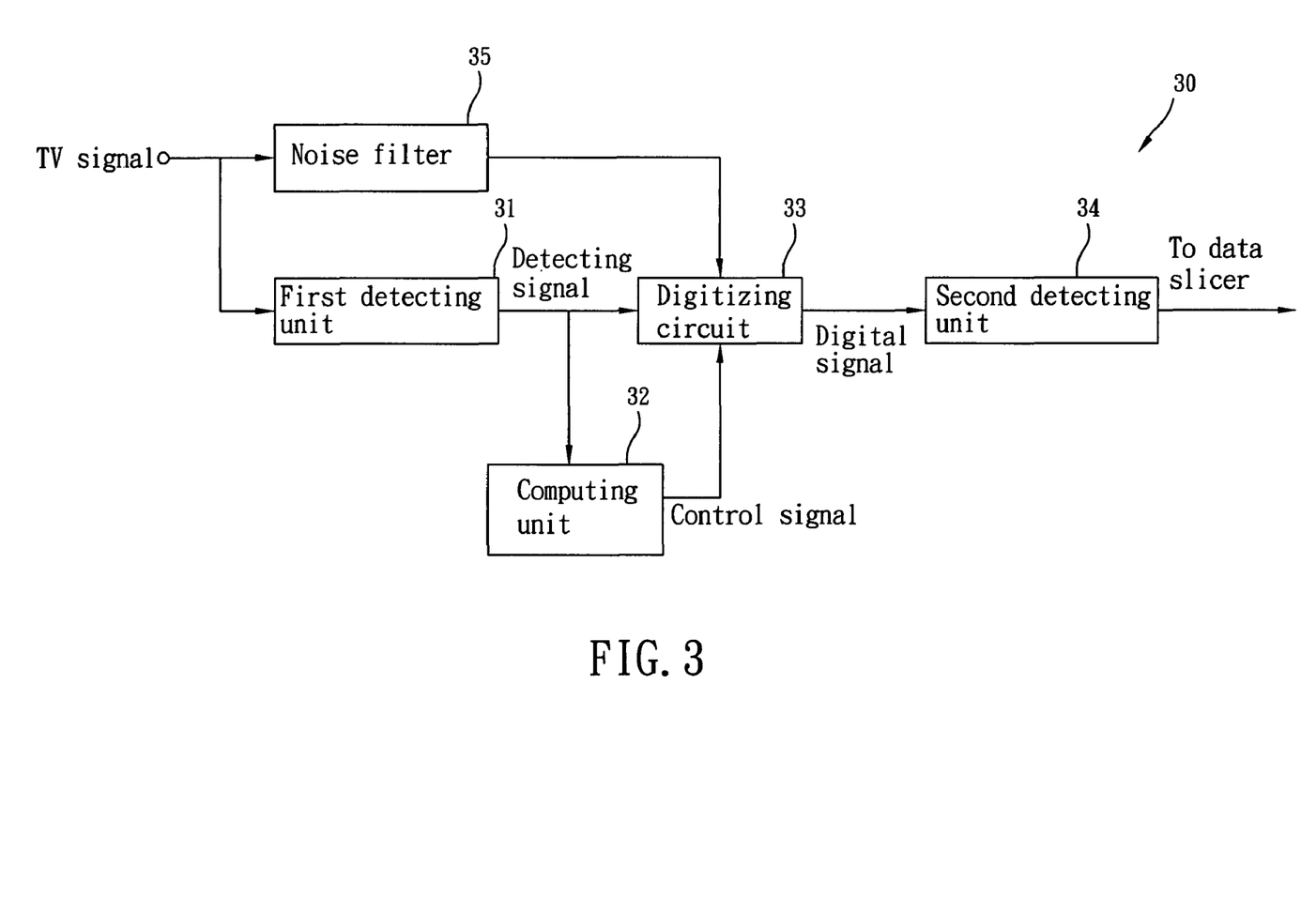
FIG. 3 is a block diagram of a VBI detection apparatus according to a preferred embodiment of the invention.

FIG. 3 shows a block diagram of a VBI detection apparatus 30 according to an embodiment of the invention. The VBI detection apparatus 30 can detect different types of VBI signals in TV signals, such as CC, CGMS, WSS, VPS, TTX625B, etc. As shown, the VBI detection apparatus 30 comprises a first detecting unit 31, a computing unit 32, a digitizing circuit 33, and a second detecting unit 34. The first detecting unit 31 receives a TV signal and generates a detecting signal according to the TV signal. The TV signal is a CVBS signal, Y/C signal, VGA signal, or Y/Pb/Pr signal. The computing unit 32 coupled to the first detecting unit 31 is for computing a slope of the detecting signal, and then comparing the slope with a first threshold to determine whether the TV signal contains a clock run-in signal of the VBI signal.

Figure 4:
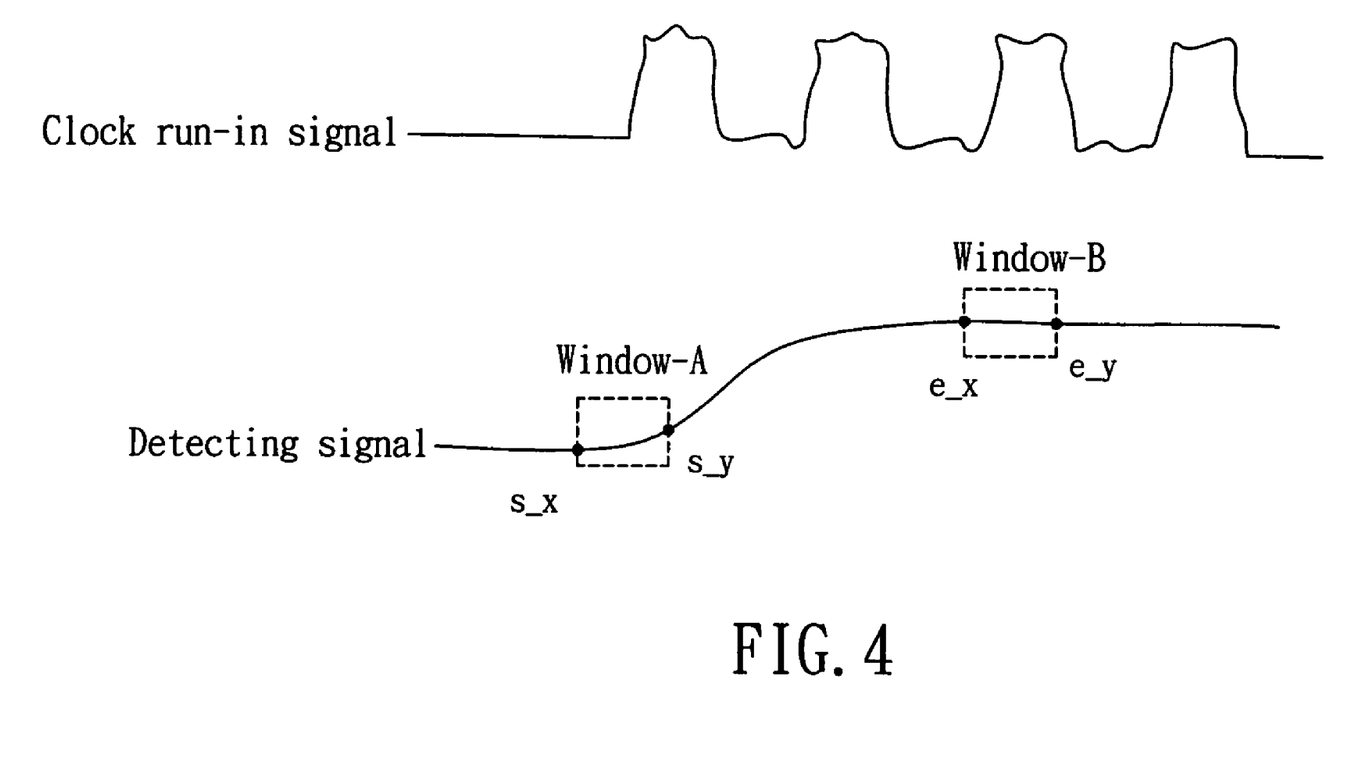
FIG. 4 is a diagram showing the correspondence between the clock run-in signal and the detecting signal in the embodiment of FIG. 3.

FIG. 4 is a diagram showing the correspondence between the clock run-in signal and the detecting signal in FIG. 3. When the first detecting unit 31 receives the clock run-in signal, it generates the corresponding detecting signal as shown in FIG. 4. The waveform of the detecting signal increases incrementally towards a stable value. The computing unit 32 picks the values of the detecting signal via a window and compute its slope. The width of the window can be adjusted according to actual situations. When the difference of the right side value s_y and the left side value s_x of window-A is greater than the first threshold, it means the clock run-in signal is detected; when the difference is not greater than the first threshold, it means the TV signal does not contain a clock run-in signal, i.e. the TV signal is not a VBI signal but a filterable noise.

Figure 5A:
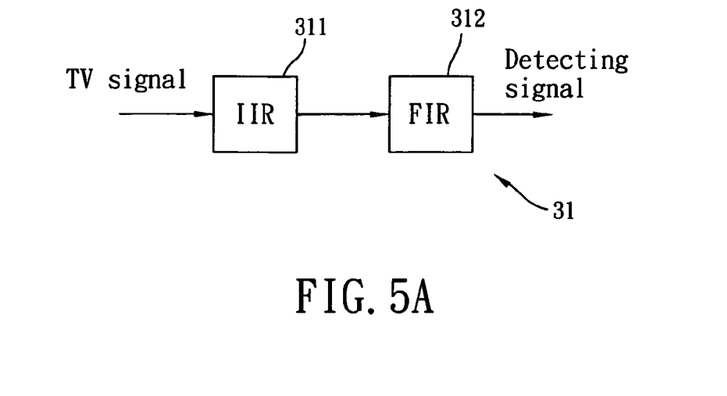
FIG. 5A is a block diagram of an embodiment of the first detecting unit in FIG. 3.
Figure 5B:
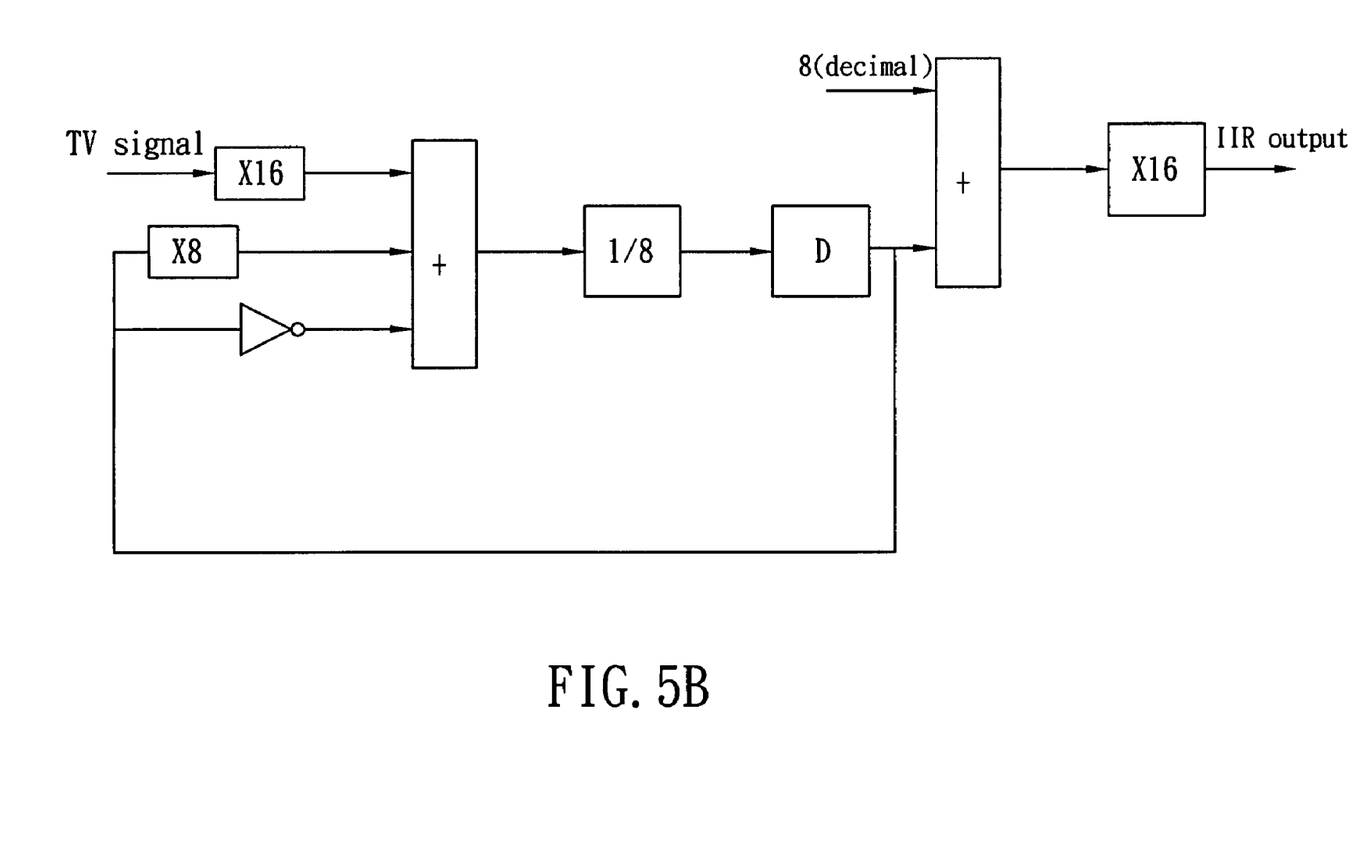
FIG. 5B and FIG. 5C are circuit diagrams respectively showing an embodiment of the IIR filter and the FIR filter in FIG. 5A.
Figure 5C:
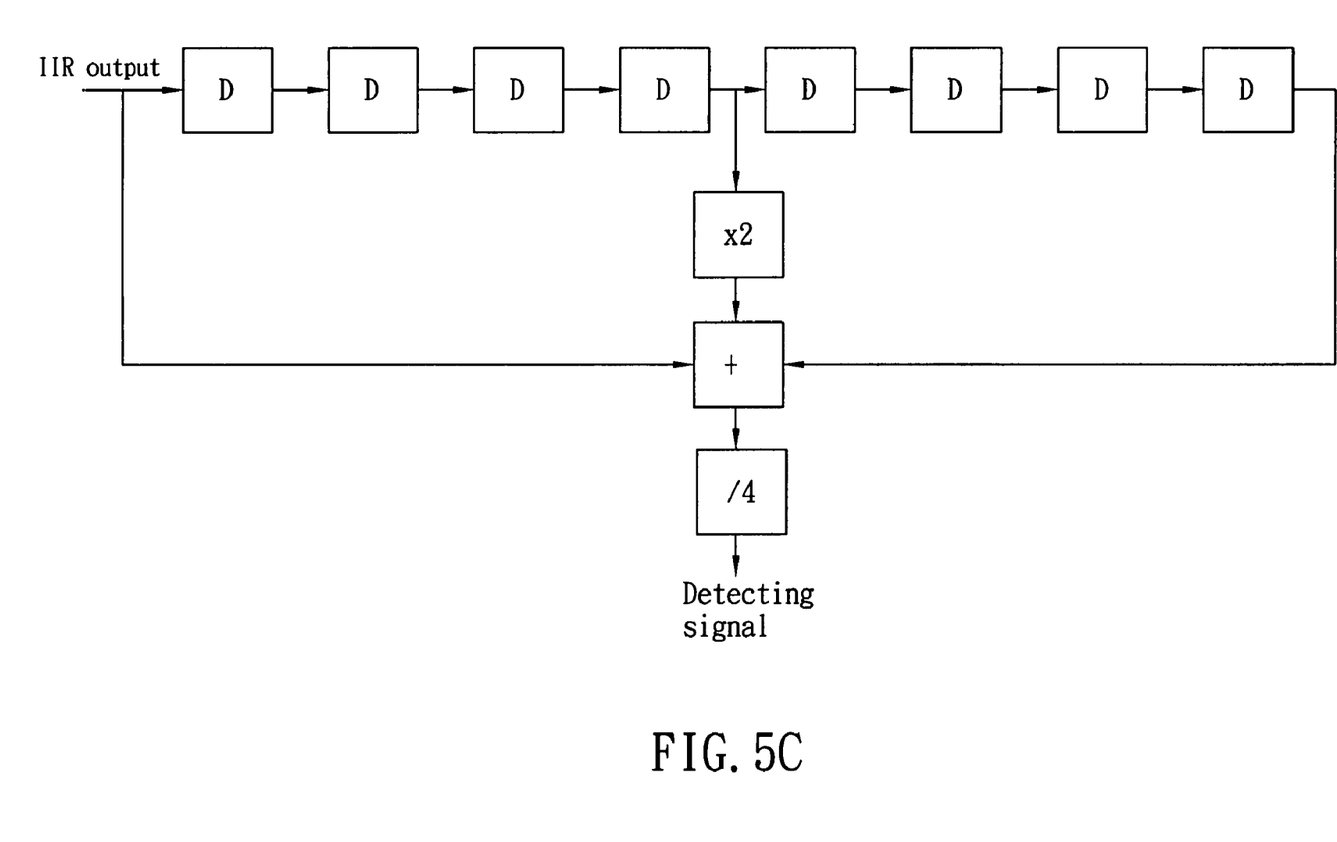
Figure 6:
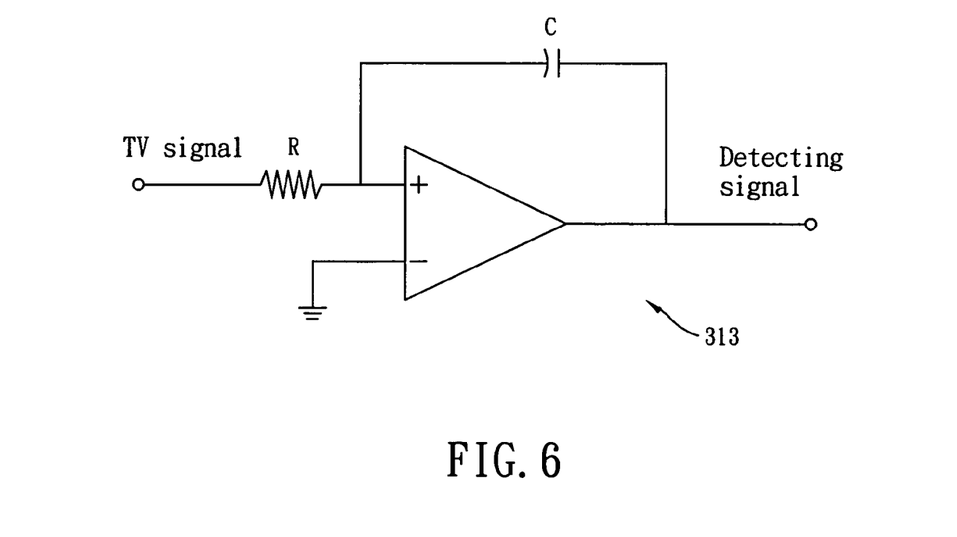
FIG. 6 is a schematic diagram of another embodiment of the first detecting unit in FIG. 3.

After the clock run-in signal is detected, the computing unit 32 will compare the slope of the detecting signal with a second threshold to determine whether the first detecting unit 31 has locked a level value (or called DC level). The second threshold and the first threshold described above can be adjusted according to actual situations. When the difference of the right side value e_y and the left side value e_x of window-B is smaller than the second threshold, it means the first detecting unit 31 has locked the level value, which is the stable value approached by the detecting signal in FIG. 4. After the first detecting unit 31 has locked the level value, the computing unit 32 emits a control signal to the digitizing circuit 33. In one embodiment, the first detecting unit 31 includes an infinite impulse response (IIR) filter 311 and a finite impulse response (FIR) filter 312 serially connected as shown in FIG. 5A. FIG. 5B and FIG. 5C are circuit diagrams showing an embodiment of the IIR filter 311 and the FIR filter 312. As shown, the IIR filter 311 and FIR filter 312 are composed of arithmetic circuits and delay elements to generate the detecting signal. In another embodiment, the IIR filter 311 is serially connected behind the FIR filter 312. In still another embodiment, as shown in FIG. 6, the first detecting unit 31 includes an integrator 313, where the detecting signal is generated by adjusting the resistance R and capacitance C of the integrator 313.

After the high-frequency noise in the TV signal is filtered by a noise filter 35, the TV signal is transmitted to the digitizing circuit 33. After receiving the control signal emitted by the computing unit 32, the digitizing circuit 33 converts the TV signal into a digital signal in reference to the level value provided by the first detecting unit 31, where the TV signal is taken as 1 if the signal level is above the level value, and taken as 0 if the signal level is below the level value. The second detecting unit 34 is coupled to the digitizing circuit 33 to detect whether the digital signal contains a frame code. The second detecting unit 34 decodes the frame code, and compare it with the frame codes of various VBI types to determine whether the TV signal contains a VBI signal and to identify the type of the VBI signal. If the TV signal contains the VBI signal, the VBI signal is transmitted to a data slicer for subsequent processing.

The VBI detection apparatus 30 in FIG. 3 can be applied to a VBI decoder to identify and filter non-VBI noises, and according to the type of a detected VBI signal, lock a corresponding level value as a reference for digitizing the TV signal, thereby enhancing the operational flexibility and accuracy of the VBI decoder.

Figure 7:
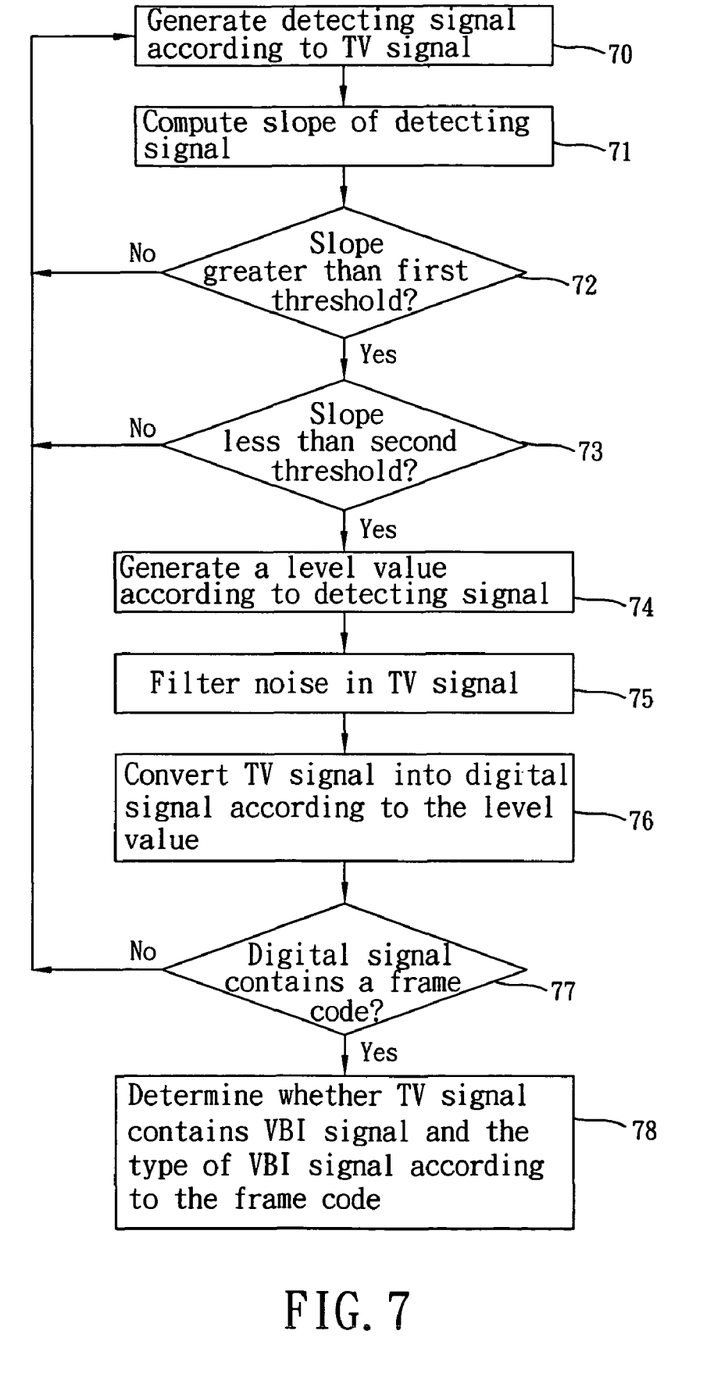
FIG. 7 is a flow chart of a VBI detection method according to a preferred embodiment of the invention.

FIG. 7 is a flow chart of a VBI detection method according to a preferred embodiment of the invention. The flow comprises the following steps:

Step 70: generate a detecting signal according to a TV signal;

Step 71: compute a slope of the detecting signal;

Step 72: determine whether the slope in a first interval is greater than a first threshold; if yes, execute step 73, otherwise return to step 70;

Step 73: determine whether the slope in a second interval is less than a second threshold; if yes, execute step 74, otherwise return to step 70;

Step 74: generate a level value according to the detecting signal;

Step 75: filter the noise of the TV signal;

Step 76: convert the TV signal into a digital signal in reference to the level value;

Step 77: detect whether the digital signal contains a frame code; if yes, execute step 78, otherwise return to step 70; and Step 78: determine whether the TV signal contains a VBI signal and the type of the VBI signal according to the detected frame code.

In step 72, it can be determined whether the TV signal contains a clock run-in signal. In step 74, the level value produced is the stable value approached by the detecting signal. In steps 72, 73 and 77 if the outcome is negative, it means the TV signal does not contain a VBI signal, and the flow would return to step 70 to begin the detection for a next incoming TV signal.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. An apparatus for detecting a vertical blanking interval (VBI), comprising:
    a first detecting unit for generating a detecting signal according to a TV signal; and
    a computing unit for computing a slope of the detecting signal based on values of the detecting signal within an adjustable window and determining whether the TV signal contains a clock run-in signal according to the calculated slope.

2. The apparatus according to claim 1, wherein said first detecting unit comprises at least one of the following: an infinite impulse response (IIR) filter and a finite impulse response (FIR) filter.

3. The apparatus according to claim 1, wherein said first detecting unit comprises an integrator.

4. The apparatus according to claim 1, wherein said computing unit compares the slope within a first interval with a first threshold to determine whether the TV signal contains the clock run-in signal.

5. The apparatus according to claim 4, wherein said computing unit compares the slope within a second interval with a second threshold to determine whether the first detecting unit generates a level value.

6. The apparatus according to claim 5, wherein said level value is a DC level locked by the first detecting unit.

7. The apparatus according to claim 5, further comprising: a digitizing circuit for converting the detecting signal into a digital signal according to the level value provided by the first detecting unit.

8. The apparatus according to claim 7, wherein said computing unit generates a control signal to enable the digitizing circuit when the first detecting unit generates the level value.

9. The apparatus according to claim 7, further comprising:
    a noise filter to filter a noise of the TV signal and send the filtered TV signal to the digitizing circuit.

10. The apparatus according to claim 7, further comprising:
    a second detecting unit for detecting whether the digital signal contains a frame code and determining whether the TV signal contains a VBI signal according to the detected frame code.

11. The apparatus according to claim 10, wherein said second detecting unit further determines a type of the VBI signal according to the detected frame code.

12. The apparatus according to claim 1, wherein the TV signal is one of the following types of signals: CVBS signal, Y/C signal, VGA signal, and Y/Pb/Pr signal.

13. A method for detecting a vertical blanking interval (VBI), comprising the steps of:
    generating a detecting signal according to a TV signal;
    computing a slope of the detecting signal based on values of the detecting signal within an adjustable window; and
    determining whether the TV signal contains a clock run-in signal according to the slope.

14. The method according to claim 13, wherein said detecting signal is generated by at least one of the following:
    an infinite impulse response (IIR) filter and a finite impulse response (FIR) filter.

15. The method according to claim 13, wherein said detecting signal is generated by an infinite impulse response (IIR) filter and a coupled finite impulse response (FIR) filter.

16. The method according to claim 13, wherein said determining step comprises comparing the slope in a first interval with a first threshold to determine whether the TV signal contains a clock run-in signal.

17. The method according to claim 16, further comprising:
comparing the slope in a second interval with a second threshold to determine whether a level value is generated.

18. The method according to claim 17, further comprising:
converting the TV signal into a digital signal according to the level value.

19. The method according to claim 18, further comprising:
detecting whether the digital signal contains a frame code; and
determining whether the TV signal contains a VBI signal according to the detected frame code.

20. A vertical blanking interval (VBI) decoder, comprising:
a detecting unit for generating a detecting signal according to a TV signal; and
a computing unit for computing a slope of said detecting signal based on values of the detecting signal within an adjustable window and determine whether the TV signal contains a clock run-in signal according to the slope.

* * * * *